United States Patent [19]
Picott et al.

[11] Patent Number: 5,929,864
[45] Date of Patent: Jul. 27, 1999

[54] SYSTEM AND METHOD FOR USING DEPENDENCY GRAPHS FOR THE CONTROL OF A GRAPHICS CREATION PROCESS

[75] Inventors: Kevin P. Picott, Burlington; Brent McPherson; Angus W. Davis, both of Toronto; Ichanahalli V. Nagendra, North York, all of Canada

[73] Assignee: Silicon Graphics, Incorporated, Mountain View, Calif.

[21] Appl. No.: 09/139,673

[22] Filed: Aug. 25, 1998

Related U.S. Application Data

[63] Continuation of application No. 08/511,114, Aug. 4, 1995, Pat. No. 5,808,625.

[51] Int. Cl.⁶ .................................................... G06F 15/00
[52] U.S. Cl. ............................................................ 345/440
[58] Field of Search ................................... 345/433, 435, 345/440, 441, 442

[56] References Cited

U.S. PATENT DOCUMENTS

| | | | |
|---|---|---|---|
| 5,651,105 | 7/1997 | Willman | 345/440 |
| 5,808,625 | 9/1998 | Picott et al. | 345/440 |

*Primary Examiner*—Phu K. Nguyen
*Attorney, Agent, or Firm*—Sterne, Kessler, Goldstein & Fox, P.L.L.C.

[57] ABSTRACT

A system and method for merging all subsystems within a graphics system into a single control entity, referred to herein as a dependency graph. The term "dependency graph" refers to a set of dependency nodes and the information flowing between the dependency nodes. Seamless interaction is accomplished by defining a strongly typed, rigidly enforced interface to the set of dependency nodes. Any dependency node that wants to interact with another dependency node must do so through a connection. The only parts of a dependency node that another node can control must be specified by attributes. In order for connections between attributes to be valid they must use the same type of information. Lastly, dependency nodes may communicate with each other by sending or receiving messages.

8 Claims, 7 Drawing Sheets

5,929,864

SYSTEM AND METHOD FOR USING DEPENDENCY GRAPHS FOR THE CONTROL OF A GRAPHICS CREATION PROCESS

This application is a continuation application of and claims priority to U.S. patent application Ser. No. 08/511,114, filed Aug. 4, 1995, now U.S. Pat. No. 5,808,625.

BACKGROUND OF THE INVENTION

1. Field of the Invention

The present invention relates to the field of graphics, and more particularly, to the use of dependency graphs for the control and management of the graphics creation process.

2. Related Art

Conventional graphics systems have a plurality of subsystems. These subsystems include, for example, animation, construction history, deformation, and most recently user defined functions. These subsystems, however, all compete for control of certain data and each subsystem is rigidly defined by the structure of the software. FIG. 2 illustrates five subsystems, each of which is connected to communicate with the others. The main drawback of these systems is that they all required complete knowledge of each other in order to operate. As additional subsystems (functions) are added to the system additional connections have to be added. A further problem is that users are never sure how a particular function will react with other functions. As a result, programmers were forced to write code that had to interact with the growing number of subsystems and their own particular quirks. Yet another problem was that the sequential order in which the subsystems executed was rigidly defined by the software.

A prior solution to this problem concentrated solely on the transfer of data. For example, the dataflow method of control has been used for many years in the scientific visualization and image processing domain. However, a more flexible structure is to allow the transfer of information as well (e.g., algorithms or actions).

Thus what is needed is a method of controlling a graphics processing system which includes a plurality of unrelated operations in which information, and not just data, can be transferred between the operations.

SUMMARY OF THE INVENTION

The present invention merges all subsystems within a graphics system into a single control entity. Seamless interaction is accomplished by defining a strongly typed, rigidly enforced interface to a set of dependency nodes. Any dependency node that wants to interact with another dependency node must do so through a connection. The only parts of a dependency node that another node can control must be specified by attributes. In order for connections between attributes to be valid they must use the same type of information. Lastly, dependency nodes may communicate with each other by sending or receiving messages.

The present invention is based on a dependency graph. The term "dependency graph" refers to a set of dependency nodes and the information flowing between the dependency nodes. The dependency graph describes the process that is used, for example, to build an entire scene and display it on a display device. A directed acyclic graph (DAG) is an example of a simplified dependency graph where the connections consist solely of the DAG parenting information. A DAG conceptually captures parenting (or hierarchical) relationships between graphic objects. Scenes are built by travelling from the root dependency nodes to the leaf dependency nodes, accumulating a transformation matrix as the DAG is traversed and applying the transformation matrix to whatever geometry is found in the leaf DAG nodes. The dependency graph extends this by capturing notions of "building" geometry via a modeling function, or deformation (for example). In this way, all of the previously separate subsystems (expressions, deformation, animation, construction history) are brought together and given a well-defined relationship.

A dependency node in the dependency graph represents a means to manipulate information. Data can take two forms: data that lives in a DAG node (e.g., geometry, lights, cameras, etc.) or information that lives in other dependency nodes. Dependency nodes offer a set of parameters to be controlled through the graph. These parameters are called "attributes." A dependency node is meant to be a completely encapsulated object, with only these attributes as connections to the rest of the graph.

Attributes are the parameters on a dependency node that may be controlled through the dependency graph. Attributes have Read/Write permissions associated therewith which indicate what can be done with them. Generally, there is a set of input attributes with read and write permission, and there is a set of output attributes with read permission only. Input attributes are data that the dependency nodes needs to perform their function. Output attributes are data that the dependency node has either created or modified in the course of performing its function. All attributes have a set of predefined data types that they accept. This means that any attribute which outputs the predefined data type may be connected to an attribute that inputs the predefined data type.

The present invention puts a "wrapper" around all data objects (e.g., DAG nodes). The "wrapper" is a window into the dependency graph. The dependency graph and DAG nodes communicate with each other through a client/server notification scheme. Thus, if one changes the other will also change. The "wrapper" is an interface. In order to communicate, dependency nodes must adhere to a pre-defined protocol.

Dependency nodes' attributes that are connected must exchange the same data type. This is known as strong typing. Each dependency node operates independently of the other dependency nodes. As such, a first dependency node does not know what a second dependency node is doing. This assures that no matter where a dependency node comes from all dependency nodes within the dependency graph will behave similarly. This independence is known as "black box operation."

In a preferred embodiment, the present invention provides a system and method for operating a graphics processing system that includes a plurality of unrelated operations.

Each of the plurality of unrelated operations are wrapped with a node, each node providing an interface for communicating information to and from the operation upon which it is wrapped. Each interface defines at least one node attribute. In response to a user request, a connection is established between a first selected node and a second selected node in accordance with the node attributes of the first and second selected nodes. Further in response to the user request, an operation of said first selected node is performed. Next, information of said second selected node is evaluated based on the connection with the first selected node and in response to an information request from the operation of the first selected node, wherein the operation of the first selected node is provided with the requested information.

BRIEF DESCRIPTION OF THE DRAWINGS

The foregoing and other features and advantages of the invention will be apparent from the following, more particular description of a preferred embodiment of the invention, as illustrated in the accompanying drawings.

The preferred embodiment of the invention is now described with reference to the figures where like reference numbers indicate like elements. Also in the figures, the left most digits of each reference number corresponds to the figure in which the reference number is first used.

DETAILED DESCRIPTION OF THE PREFERRED EMBODIMENTS

Environment

Figure 1:
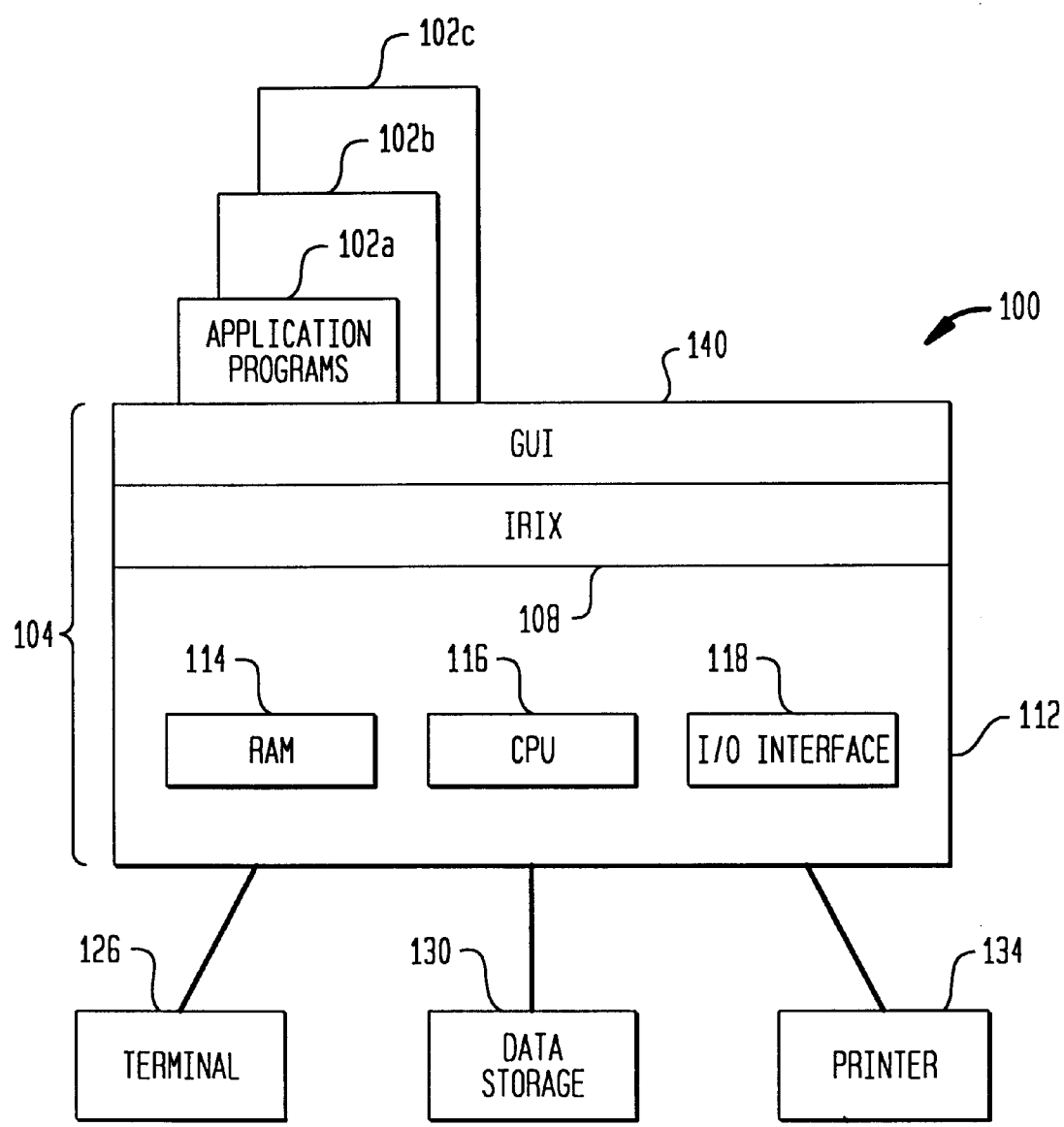
FIG. 1 illustrates a general hardware environment in which a preferred embodiment of the present invention can operate.

FIG. 1 illustrates a general hardware environment in which a preferred embodiment of the present invention can operate. The environment 100 of the present invention includes application programs 102a, 102b and 102c. Computer platform 104 includes a hardware unit 112, which includes potentially multiple central processing units (CPUs) 116, a random access memory (RAM) 114, and an input/output interface 118. Computer platform 104 includes an operating system 108. Various peripheral components can be connected to computer platform 104, such as a graphics terminal 126, a data storage device 130, and a printing device 134.

Computer platform 104 is any personal computer, workstation or mainframe computer. In a preferred embodiment, CPU 116 is any processor from the MIPS™ family of processors including R3000. Operating System 108 can be any operating system compatible with computer platform 104. In a preferred embodiment, operation system 108 is the IRIX™ operating system version 5.3 or greater available from Silicon Graphics. IRIX supports an XWindows™ based graphical user interface (GUI) 140.

2.0 Introduction

The dependency graph, hereinafter referred to as "the invention", describes a method of controlling systems including but not limited to all of those involved in the computer graphics content creation process. At a minimum this includes modeling, animation, rendering, compositing, digital paint, and image processing. We claim the invention is suitable for use in not only this minimal set of the content creation process but all other areas that are used to create the final output as well.

2.1 Glossary

This section will define some terms used throughout the rest of this document. In the case that the word has a more common usage the usage described herein should be taken as the intended meaning.

Attribute: A piece of information that a node uses in order to perform its operation. This is information in the abstract sense, (e.g., the statement "I need a banana to perform my operation" is abstract information, as opposed to an actual banana which is data).

Connection: A data pathway between two nodes through which they can pass information. A directed connection restricts the information to only pass in one direction.

Control System: A subsystem dedicated to the control of communication and relationships between other subsystems.

Data: Any type of information that is represented by some concrete object, (e.g., a particular banana would be data but the concept of what a banana is would not).

Dependency: An object A has a dependency on an object B if altering some part of B would affect some part of A.

Evaluation: The process of interpreting data using an algorithm to produce a resulting set of data.

Fan-in: Multiple connections at the same input.

Fan-out: Multiple connections at the same output.

Graph: An arrangement of nodes and connections between them. A graph is taken in the general form where it is not necessary that all nodes have connections (nor all subgraphs be connected together).

Information: Some form of knowledge that flows through the graph. This could be either abstract (algorithms or descriptions) or concrete (data).

Node: An entity in the graph that embodies an operation of some sort.

Subsystem: A particular section of a system that controls unrelated operations that are logically similar.

System: All of the pieces that go into defining how a process (e.g., graphics content creation) works.

Wrapping: The process of creating an external data object that refers to an presents an alternate interface for an internal data object.

3.0 Description

The invention is a method of controlling operations that have dependencies on each other. It can be conceptualized by using a graph where the nodes represent operations and the connections (lines) represent the dependencies.

3.1 Merging Control Systems

Figure 2:
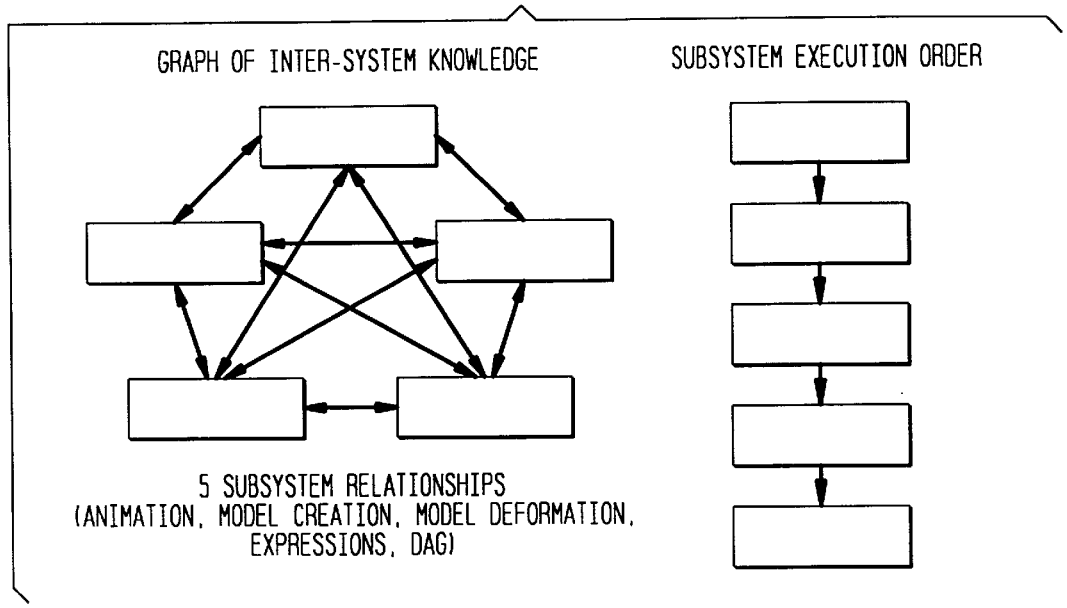
FIG. 2 illustrates a conventional approach to controlling a set of subsystems.

In previous approaches there were a collection of subsystems all representing the various phases of graphics content creation (Animation, Model Creation, Model Deformation, etc.). The main drawback to these systems was that they all required complete knowledge of each other in order to operate. In addition, since this knowledge was in actual code, they had to be executed in some hard-wired order according to what the code dictates. Changing the order of application of any system was difficult (e.g., animation of construction history, creating a model and using deformation) and adding new systems as new technology became available was at the point of being prohibitive (e.g., adding motion capture and dynamics simulation). This is shown generally in FIG. 2.

Figure 3:
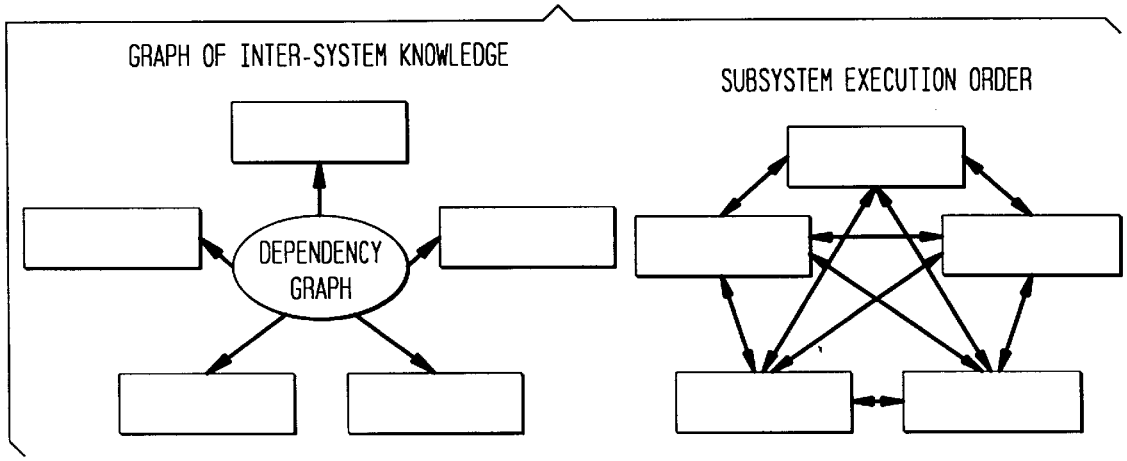
FIG. 3 illustrates an architectural overview of the present invention.

The invention removes the restrictions implicit in this subsystem model by introducing itself as a control system that manages all of the inter-system relationships. This is shown generally in FIG. 3. The dependency graph serves as a "hub" so that independent systems need not know anything about each other. Note that each system contains a set of unrelated operations. As can be seen, there is no limitation placed on the execution order of the individual subsystems. Accordingly, arbitrary, and possibly repetitive execution order allows systems to interact in any way possible.

3.2 Making a Graph

The main job of the invention is to allow independent subsystems to work together without knowledge of each other. In order to accomplish this it establishes itself as the single point of contact between systems. To do this it defines a communication and connection protocol that all systems must adhere to. This ensures that it can not only communicate with them but also interpret and pass on this information to other systems as appropriate.

3.2.1 Nodes

The nodes are the components of the graph that implement the operations that the graph will be performing. In order to enforce the single point of contact all nodes have black-box operation. That is, the only information they are allowed to send/receive to the rest of the world must be presented as attributes of the node. Conversely if a node has the information from all of its input attributes it must be able to produce the information it is presenting at its output attributes.

3.2.2 Attributes

An attribute on a node defines a potential communications channel. These attributes may be input only, output only, or both. An input attribute is defined as an information channel that can only feed information into the node. Similarly an output attribute can only feed information out from the node. The attributes are used to define the "allowable" connections between nodes. They tell the graph what kind of plugs and sockets the node understands.

Attributes are not shown in the diagrams but are assumed to be present at both ends of all connections.

3.2.3 Connections

Given a pair of attributes with compatible plugs/sockets in order to get them to communicate you must wire the plug on the input attribute to the socket on the output attribute. This wiring is referred to as the connection. (Note that since the attribute is merely a description of the plugs available it is entirely possible but not required that more than one connection to the same attribute can be made. This is commonly referred to as fan-in and fan-out.) Connections need not be physical entities, just a method of getting information from one attribute to another.

Connections are drawn as arrows with the flow of information indicated by the direction of the arrow.

3.2.4 Information

If the system described so far is like the plumbing then the information is the water that flows through it. Information travels through the connections between attributes on nodes. Information is exactly as the dictionary defines it: "a report of events or conditions not previously known". This can come in the form of concrete data, like a floating value, or abstract knowledge, like a matrix inversion algorithm. In all cases it is something that a node requires in order to perform its function.

In traditional approaches to the problem of an integrated control system found in any of the dataflow systems is a protocol set up with the limitations that the connection between operations ("nodes") is hard wired and only a specific type of data propagates ("flows") between connected nodes (and only in one direction). The invention removes these restrictions by using a plug-and-socket metaphor to define the available communications channels.

Each node must define the information that it requires ("attributes") in order for it to perform its function, as well as the information that it produces. Information flowing out is like a plug. The legal connections between nodes are any two attributes where the plug type matches the socket type. The plug/socket types are defined by what type of information is required/available for the given attributes. At the highest level three plug types represent abstract information (algorithms/descriptions), concrete information (data), and pure communication. This is like having a North American outlet, a European outlet, and a phone outlet. You cannot plug communications into a data outlet no more that you could plug your home phone into the hydro socket. This strong typing can be broken into as fine or coarse a granularity as is needed for the particular application. The way that it is superior to traditional approaches is that objects can be identical at certain levels of granularity so that more than one type of data can flow across the connection depending on what is being generated.

In addition, since this system is not bound by the limitations of physical objects, information sockets can be defined that accept a variety of different plugs; not necessarily just those that look kind of the same. It is then up to the node to decide what to do with the information that arrives through its sockets.

The above shows how the invention removes the "data only" and "hardwired" restrictions of the data-flow model. Plugs can be arbitrarily removed and inserted into new sockets, so long as they are of compatible type. No concrete data needs flow across these connections; it can be abstract information such as an algorithm to be used in computation, or a description of how to get at the other hidden data (like a file handle for getting data from a file).

The restriction of one-way dataflow is removed by the fact that these connections are communications channels and information can flow in either direction. There will be a usual flow of information from dependees to dependents but there is no restriction on information flowing the opposite way.

Once all nodes are connected in this way the invention controls the flow of information by remembering what connections need evaluation, ensuring the dependee/dependent relationships propagate their information correctly and in a timely manner, and managing all connections and disconnections of nodes within the graph.

3.3 Separate Controller or Integrated System

Although the invention successfully merges many subsystems together into a unified whole it is still desirable for some systems to maintain autonomy outside of graph operations. An example of this is a hierarchical modeling system, commonly known as DAG (Directed Acyclic Graph). Each node in a DAG defines a transformation and the connections define a parenting relationship, creating a very powerful metaphor for the construction and manipulation of computer models, (e.g., a DAG allows you to create a model so that when you move the shoulder the forearm moves with it, but when you move the forearm the shoulder remains still).

The invention does not desire to take away the power. inherent in alternate paradigms such as this, but still needs to integrate their operation with the other subsystems being controlled. (It may also be the case that the system to be integrated is closed in that the invention cannot alter the original in any way and so must make use of it as is.)

In order to solve this the invention uses a wrapping technique. Operations or objects in the separate system are identified at the granularity that they require control (e.g., DAG nodes from a DAG based system) and then dependency graph nodes are created that present the available controls of the object/operation as attributes of the node (e.g., Translate X, Translate Y, Translate Z would be typical attributes of a DAG transformation node). This technique can be used to allow the dependency graph to control any external interface presented by the separate system, while still allowing the seperate system to use its own internal functions to be used normally.

In addition, since typically the separate system may modify things that affect the output attributes, a communication system can be used to detect and propagate any changes that the separate system makes internally.

Figure 4:
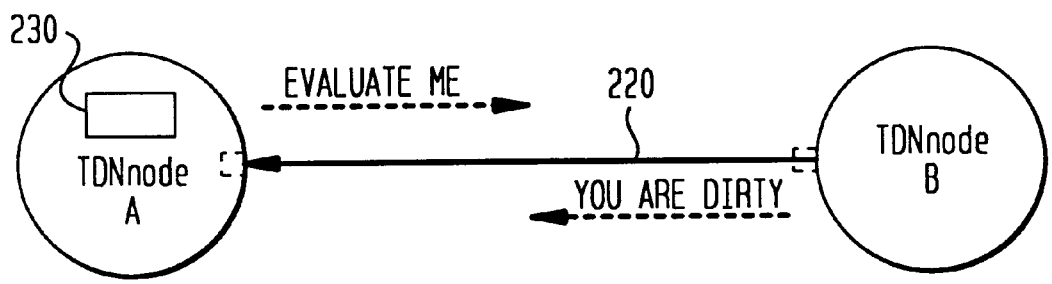
FIG. 4 illustrates the exchange of data between two dependency nodes.

FIG. 4 illustrates the exchange of data between two dependency nodes: node A and node B. Dependency node A is "wrapped" around a DAG node 230. Dependency node A receives data from dependency node B across communication link 220. When dependency node B changes, it must update dependent node A. In order to achieve this result, dependency node B sends a message to dependency node A stating that "you are dirty" and therefore must update yourself. Dependency node can either ignore this message or respond to this message. When DAG node 230 requests redraw of dependency node A, dependency node A sends an "evaluate me" message to dependency node B. Dependency node B then evaluates and returns results to dependency node A over communication channel 220. Note that dependency node A knows how to control DAG node 230. Thus, when data is returned from dependency node B, dependency node A can pass the data onto DAG node 230.

3.4 Pseudo-Code

This section will describe one possible implementation method for the invention, although many more are possible. A C++-like form of pseudocode is used since that is the first implementation language of the invention.

3.4.1 Defining Nodes

Defining nodes involves at least two main functions. Defining the interface and defining the evaluation.

```
DefineInterface()
{
  For each attribute the node is allowed
    define the attribute
    add the attribute to the node's list
}
Evaluate (OutAttr)
{
  if( outAttr is not readable )
    quit
  For each input attribute required to compute OutAttr
    if( input attribute is connected )
      Evaluate input attribute connection and save
    also
      save default attribute value
  Do comparison to find outAttr value
  Return the value to the calling routine
}
```

3.4.2 Making Connections

In order to make a connection two things are required; an input side and an output side. The definition of each side requires an attribute and a node.

```
inAttr= input attribute to be connected
outAttr= output attribute to be connected
if( information types used by outAttr and inAttr do not match)
  quit
inNode = input node that is to be connected
outNode = output node that is to be connected
if( inNode is connected to InAttr
or outNode is connected to outAttr )
  (for later use)
```

3.4.3 Evaluation

The evaluation loop occurs entirely through the node's evaluation process. The only other thing required is that the same external (or internal) agent request the value of some node's output. This causes the node to evaluate that output, which in turn (as shown above) causes the node's inputs to be evaluated which themselves cause others to evaluate, and so on.

One addition to this loop, the use of a dirty status, within the connections allows minimal recomputation via a push-pull evaluation model.

```
PUSH
<User changes something that invalidates some node data>
For each ( output attribute on the node )
  if( attribute is connected )
    mark the connection as dirty
    set the connected node to be dirty as well (recurse)
PULL
<User requests some node evaluation>
For each ( output attribute requested to evaluate )
  if( attribute is connected
  ££ connection is dirty
    Evaluation the node at the attribute
  else
    Return the current value of the attribute.
```

3.5 Pseudo-Code (Specific Examples)

This section shows some actual node/attribute/connection implementations as a more concrete form of the pseudo-code presented earlier. A C++-like form of pseudo-code is used since that is the first implementation language of the invention.

3.5.1 Data Structures

The format used will be

```
StructureName
    FieldName              FieldDescription
    ::MethodName (methodParameters)
                           MethodDescription
```

When "StructureName" is the name of the data structure, "FieldName" is the name of one of its components and "FieldDescription" describes the component. "MethodName" is the name of member function that the structure uses. Its parameters "methodParameters" and its operation is described by "MethodDescription." When referred to in the pseudo-code the abbreviation StructureName FieldName will be used to indicate a particular component of a data structure.

```
Node
    InputList       List of all input connections on this
                    node
    OutputList      List of all output connections on this
                    node
```

| | |
|---|---|
| AttributeListList | List of all attributes available on this node |
| ::create () | Constructor |
| ::evaluate (Attribute) | Evaluates the output attribute and returns the resulting value. |
| Attribute | |
| Readable | If "true" the attribute can be an output |
| Writable | If "true" the attribute can be an input |
| InfoType | Type of information the attribute expects |
| Connection | Connection to this attribute (if any) |
| ::evaluate() | Evaluate this attribute (if connected) |
| ::connectTo (Attribute) | Makes a connection with another attribute. The assumption is that the attribute that calls the method is to be the input side. |
| Connection | |
| InAttribute | Attribute at the connection's input side |
| OutAttribute | Attribute at the connection's output side |
| InDirty | Is the connection currently dirty? |
| InNode | Node at the connection's input side |
| OutNode | Node at the connection's output side |
| Information | |
| Id | Value to identify the type of information |
| Data | Actual data needed to define the information |

3.5 Node/Attiibute Definition

This section will show how to define some simple types of Node (and the interface to be presented in the graph). First some common code:

```
Attribute
  ::evaluate()
  {
    if( Attribute is Connected && Attribute is Input
      return evaluated valtie of output attribute
        on the output node;
  }
  ::connectTo(inNode,Other,OutNode)
  {
    if( InfoType == other:InfoType
    && connection is okay with both nodes
      create new connection
      add it both attributes
  }
```

The first operation is ADD which will take as input two floating point numbers and produce their sum as the output.

```
AddNode
  ::create()
  {
    Create Input 1 Attribute(Writable,Float)
    Create Input 2 Attribute(Writable,Vector)
    Create Output Attribute (Readable, Float)
  }
  ::evaluate (Attribute)
  {
    if( Attribute == Output Attribute )
      vector1 = Input 1 Attribute::evaluate()
      vector2 = Input 2 Attribute::evaluate()
      return (value1 + value2);
  }
```

The second operation is DOT_PRODUCT which will take as input two vectors and produce a floating point number (the inner product of the vectors) as output

```
DotProductNode
  ::create()
  {
    Create Input 1 Attribute(Writable,Vector)
    Create Input 2 Attribute(Writable,Vector)
    Create Output Attribute (Readable, Float)
  }
  ::evaluate()
  {
    if( Attribute == Output Attribute )
      vector1 = Input 1 Attribute::evaluate()
      vector2 = Input 2 Attribute::evaluate()
      return( DotProduct(vector1, vector2) );
  }
```

The third operation creates a Surface of revolution from a Curve and a Float (sweep angle) using an internal operation called::Revolve(Curve,SweepAngle)

```
RevolveNode
  ::create ()
  {
    Create Curve Input Attribute(Writable,Curve)
    Create Sweep Input Attribute(Writable,Float)
    Create Surface output Attribute (Readable, Surface)
  }
  ::evaluate (Attribute)
  {
    if( Attribute == Surface Output Attribute )
      curve = Curve Input Attribute::evaluate()
      angle = Sweep Input Attribute::evaluate()
      return( ::Revolve(curve,angle) );
  }
```

3.5.3 Connection

For this example the ADD method will get the sum of two DOT_PRODUCTS which will feed into the sweep angle of a REVOLVE.

```
Create the two DOT_PRODUCT nodes
Get the DOT_PRODUCT output attribute
Get the ADD input 1 attribute
Connect the ADD node attribute with the first
    DOT_PRODUCT node's attribute
Get the ADD input 2 attribute
Connect the ADD node's input 2 attribute with the second
    DOT_PRODUCT node's output attribute
Get the ADD output attribute
Get the REVOLVE input sweep angle attribute
Connect the two attributes
```

All information that flows between attributes in the dependency graph must be wrapped in a class from the information hierarchy. The hierarchy provides a common base class so that information can be at least partially type checked and read/write permissions can be used to allow smart caching of results. There are two types of data in the information classes: lightweight and heavyweight. Lightweight data is anything which is normally passed by value (e.g. double precision, floating point, integer, boolean). Heavyweight data is anything which is normally passed by reference, or which has an expensive copy function (e.g., Surface, Curve, shape). Information classes uses the permission data to determine when copying of the data is necessary and when a reference will suffice. In general, a copy is necessary when the data is read-only and the user wants to write on it.

While the attributes indicate what sorts of information may be connected in the dependency graph, the connections are the actual arcs in the dependency graph which define the information channels that have been created. Connections are split into three parts: the identification of the two actual attributes that are connected and the data that is common to both of them. The former is further broken into derived classes which handle simple attributes, multiple attributes and compound attributes. These derived classes are not usually used explicitly since everything needed for querying the connection sites is available in the base class. Some notable things that the connection classes do are pass on messages from one dependency node to another, retain dirty status for smarter evaluation, perform evaluation (by passing information to the output-side node).

Messaging forms the heart of the graph's communications. Nodes pass messages to each other to indicate that things have changed, that they need evaluation or for any other reason that they might request some work/data from another dependency node. The base node class knows how to handle only the above messages but a major goal of the messaging is to allow anybody to teach any dependency node how to react to a given message. The messages all derive from a common base class which itself is derived from the normal client-server message class. The reason for this second level of indirection is in order to add a unique Id to the message which can be used to detect and avoid loops.

4.0 Improvements on Existing Systems

There are three main types of similar existing control systems which will be addressed separately. The most unique thing about the invention is that it tackles a very broad spectrum of tasks using combinations of old and new methods that were originally meant for very defined and narrow tasks.

4.1 DataFlow

The dataflow method of control has been used for many years in the scientific visualization and image processing domain. It is probably the most similar to the dependency graph system in that it involves creating a graph consisting of data operations as nodes and data pathways as connections.

Figure 5:
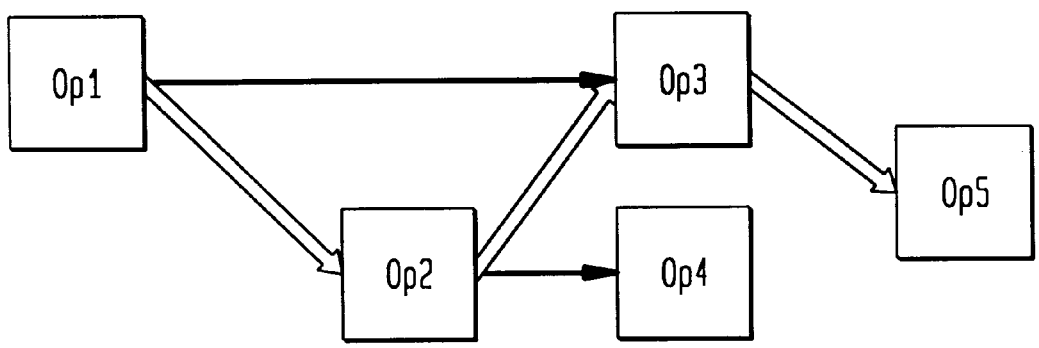
FIG. 5 illustrates the dataflow method.

Referring to FIG. 5, the data pathway takes data from Op1, feeds it through Op2 and Op3 to finish up in Op5. Typically, one of these will be a display node so that the data can be seen by the user. Most applications using this paradigm have been single data types (e.g., in image processing the data type is always "image") or at most a few well defined data types. The dependency graph's notion of data is not restricted in this manner. It can handle as many different types of data as can be created.

The dataflow solution can be thought of as a pipeline through which water (data) "flows". Each node represents an operation on that data, like coloring the water or reducing the volume and so forth. Each operation alters the water in some way but never changes the inherent nature of water; it is still liquid, it still has the same chemical formula ($H_2O$), it still occupies space, and so forth.

4.1.1 Strengths

Excellent paradigm for single-data type systems.

This is just a special case for the invention. Single data type means that only one type of plug/socket is available, thus simplifying the connection process.

Linear sequence of operations handled very well.

Again this is just a special case where the invention is restricted to not use fan-in/fan-out.

Can view data at any stage of the pipeline.

The invention allows for this in two ways: first for geometry a DAG node can be inserted in the connection that the data to be viewed is flowing, and second any data can have a "View" node created for it that will take the data as input and pass it on unchanged with the side effect of displaying the data as it passes through.

Operations can be parallelized.

The black box operation of the invention ensures that parallelization of the graph is possible by having the graph dispatch the requests for evaluation to as many processors as it controls.

4.1.2 Shortcomings

Strictly defined data pathways.

The pathways in the invention are just communication channels and they can be rewired at any time. All that is required is the new connections meet the same guidelines for plug/socket matching as the originals.

All information must be available at all connection pipes.

This is caused by the dataflow "view anywhere" ability. For instance in order to view geometry halfway through a pipe all of the display information for the geometry must be available (including shader information, resolution, etc.). By having a separate DAG for display the invention can carry along only as much information as it needs for the operations, keeping the rest in the DAG nodes to be displayed.

Only data can move between nodes.

An obvious shortcoming when trying to define interchangeable algorithms the invention overcomes this by generalizing the definition of communication between nodes from strictly data to "information". The dependency graph allows data which is not an object, but an algorithm. This would be akin to having water travel through the pipe along with the rules for how it behaves. Now a node is free to alter not only the water but also its behavior; for example, a dependency graph node could change data from water to ice, or to rock, or make it more or less viscous, and so forth. Since it is not necessarily "data" that is flowing through a dependency graph it's usage is more general.

4.2 Simulation

Some techniques are in use which make extensions from dataflow similar to those of the dependency graph for the purpose of running simulations (usually some form of physically based modeling/animation). In these systems algorithms and rules of behavior are passed through the graph as in the dependency graph.

There are two main differences in the way the graph is managed in a simulation system. The first is that all animation must run synchronously so the entire graph has the notion of "current time" embedded in it. This makes these systems ineffective for modeling based operations such as construction history, since in the majority of cases modeling operations do not happen over time they simply describe the history of the object's creation.

This is different from "animation history" which describes how you want the object to move through the course of an animation. Construction history is in the past, animation is in the future. The dependency graph uses time not as a special entity but just as another part of the system that nodes may have a special interest in. (This moves the uniqueness of time out of the graph and into the individual implementation-defined nodes.)

The second restriction that simulation systems employ is the fact that all connections must have a well-defined coupling. That is, the simulation requires a certain feedback loop to be implemented in the graph in order for it to iterate to its solutions. If this feedback loop was altered then the simulator would be confused as to how convergence happens since its output may be tampered with to the extent that it never comes close to a solution.

4.2.1 Strengths

Excellent control of physically based events.

The invention allows for the same time-specific operations through the addition of a node in the graph that represents time. This is more general than embedding time into the graph because this time node can be replaced by any other node that supports the same data type (e.g., an expression, a warped time, a real-time clock, etc.).

Can roll time forward/backwards in any increment for collision detection, etc.

As above the invention has full control over time. In addition the communication connections can be used to propagate information to time itself (e.g., to change, to slow down, to speed up, to change increments).

No worries about objects at different times since time is so entrenched.

Again, since time is under full control using the invention this is handled.

Motion of objects entirely defined by simulation algorithm.

If this is the desire then it is a subset of the invention which does not allow any nodes outside of the simulation nodes. While greatly desirable for pure simulation, the more general applications in animation make this a weakness which the invention does not share.

4.2.2 Shortcomings

Hard or impossible to combine simulated/non-simulated controls.

Since the invention does not even know what simulation is the combination of non-simulation based controls is a basic part of the system.

Unsimulated operations (like modeling) don't fit well.

Again since time is only another node in the system modeling operations can safely ignore it and operate in the manner they wish. The invention is particularly well suited to pure modeling operations since the restrictions they require of the invention make it very simple to understand.

Everything typically has its own unique time, leading to confusion.

Every piece of data in the invention has a value, without any notion of time or anything else. So long as the proper data is updated when required there is no confusion about what certain data means.

Arbitrary connectivity causes trouble for the simulator.

Any simulation that is put into the invention will have all of the communication channels available to it, allowing for the possibility of either non-converging simulation or value overrides when multiple controls are present on a single object (i.e., the simulation can either remember where it is iterating to or can be allowed to provide non-unique solutions that are "steered" by the other nodes in the graph).

5.0 Perceived Uses

Figure 6:
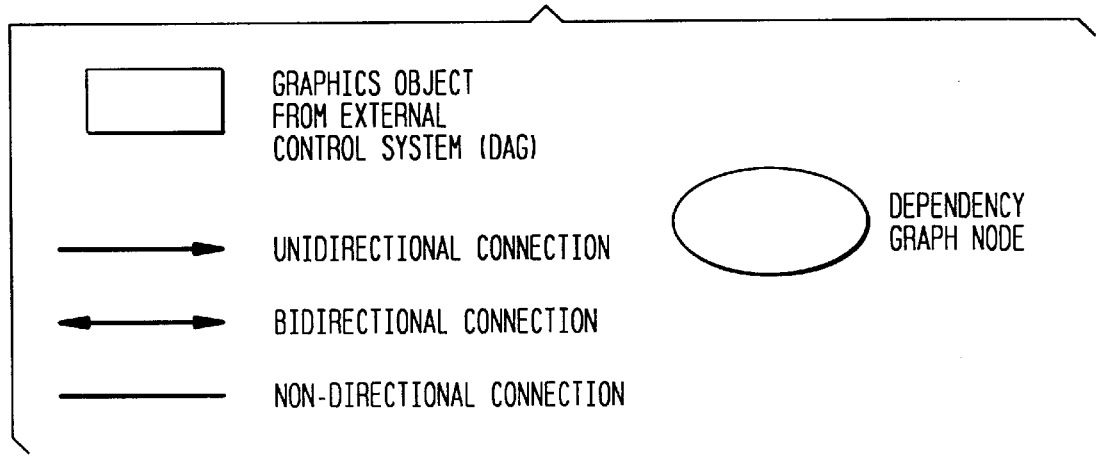
FIG. 6 is a legend used to define graphical objects that are used in FIGS. 7–12
Figure 7:
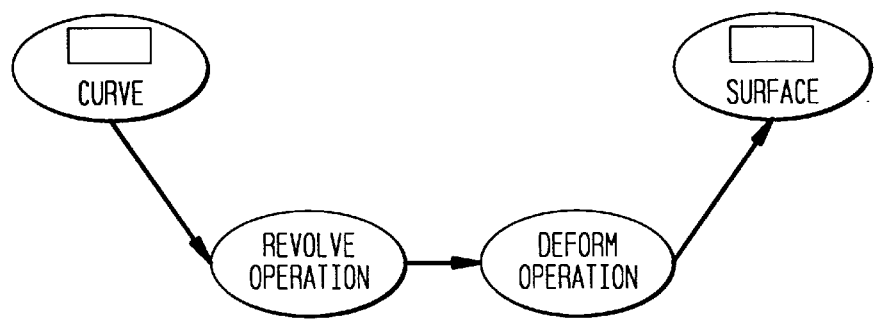
FIG. 7 illustrates an example of applying the present invention to a REVOLVE operation.

This section outlines but does not limit some uses for the invention in the field of computer graphics content creation. FIG. 6 is a legend that defines graphical objects used in FIGS. 7–12.

5.1 Modeling

The invention provides a "recipe" for creating the final model by tracing the final result back through all of the dependees that created it.

By "reading" through the connection path we can describe how the surface was created. In the example shown in FIG. 7 the curve goes through a REVOLVE operation to become a surface of revolution, which is then in turn deformed to produce the final output surface.

5.2 Animation

Figure 8:
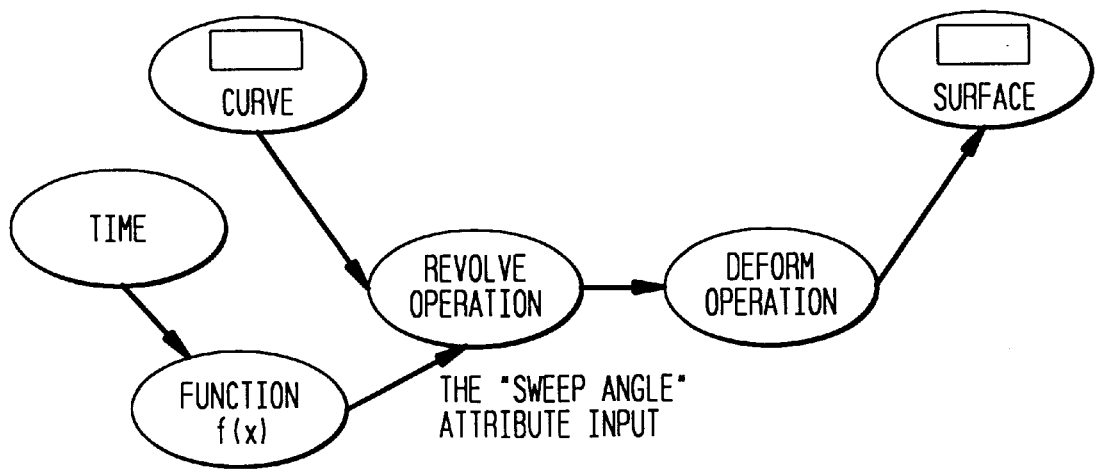
FIG. 8 illustrates an example of applying the present invention to an animating the results of a REVOLVE operation.

The invention itself has no notion of what time is so it is up to the external application to introduce the concept by introducing a "time" dependency node. A node is said to be "animated" if somewhere along the line it is dependent on the time node. Lets take the REVOLVE example above and assume that the REVOLVE node has a second input attribute representing the sweep angle. We can make this surface create itself over time by controlling the sweep angle with a function of time. This is shown in FIG. 8.

In order to show this animating you only have to change the TIME node. This informs its dependent (FUNCTION) that it needs to evaluate, which informs its dependent (REVOLVE) and so on up to SURFACE. The new surface will be based on the DEFORMed REVOLVEed CURVE with a swept angle equal to the FUNCTION of TIME. Note that all updating happens automatically, requiring no knowledge of how the invention works inside of the nodes or connections.

5.3 Rendering

Figure 9:
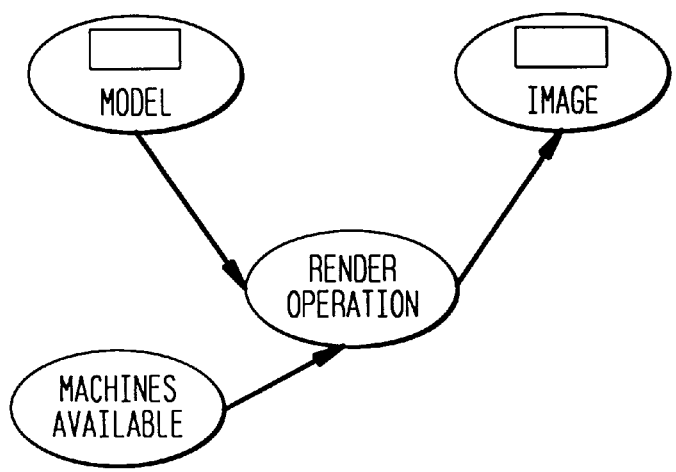
FIG. 9 illustrates an application of the present invention to a RENDER operation.

Referring to FIG. 9, Once a project has an animated model the next thing you typically do with it is render it. Typically this is a separate process with no knowledge of the modeling and animation that went into its creation, however the invention merges these processes so that changing the model can have information sent to the renderer to make it rerender.

5.4 Paint/Compositing

Figure 10:
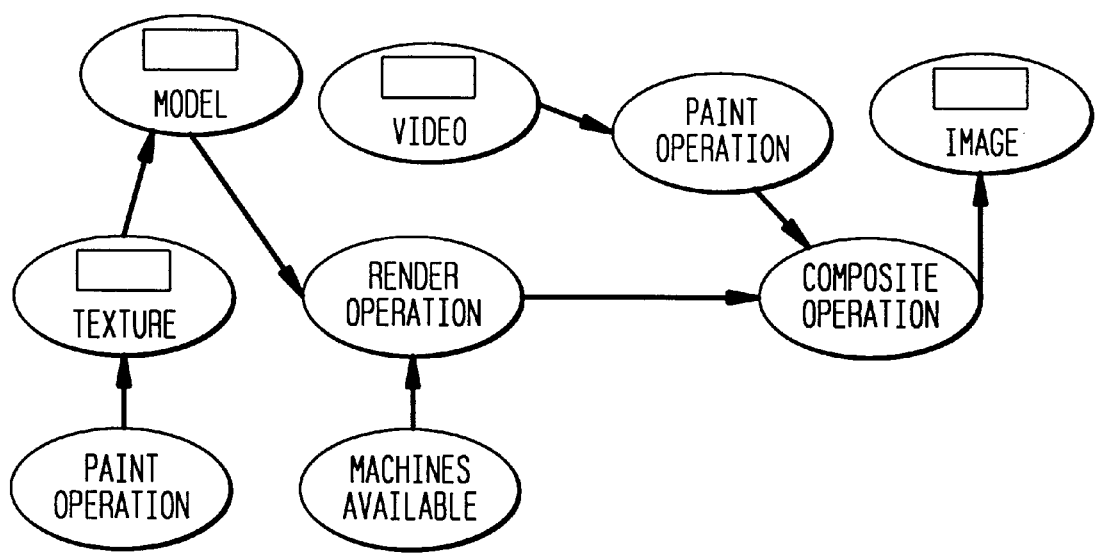
FIG. 10 illustrates an application of the present invention to a Paint/Compositing operation.

Referring to FIG. 10, painting can occur at any point in the creation process. At the beginning it can be used to sketch out rough models for preliminary animation, in the middle it can be used to paint textures for objects, and at the end it can be used to alter the rendered image. Compositing usually happens at the end but of course the invention makes no restrictions along these lines.

The left hand side of FIG. 10 shows creation and application of a painted texture onto a model. The right hand side of FIG. 10 shows compositing of the rendered image with a painted video output to yield the final image. Now the creators of the renderer, compositor, paint program, and modeler are freed from having to know how their output will affect the next step in the creation process. It is all encoded into the dependencies.

5.5 Project Management

FIG. 10 is an illustration of a high level project management task implemented by the invention. All of the functions of modeling, rendering, painting, and compositing are controlled by the invention. Once again this illustrates the difference between the invention and other similar processes; the invention has not restricted its problem domain in one particular niche task, but rather keeps itself general enough to handle a whole spectrum of tasks.

Figure 11:
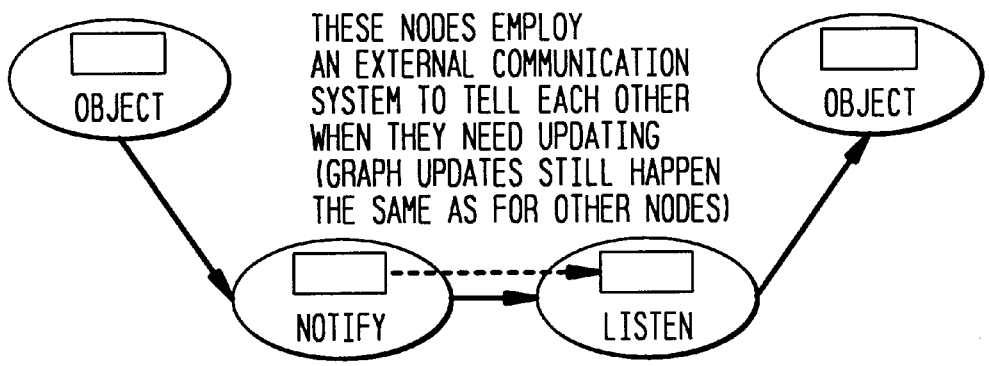
FIG. 11 illustrates a collaborative development using the invention to communicate between multiple developers.

Another illustration of the possibility of collaborative development using the invention to communicate between multiple developers. This is shown in FIG. 11 Communication nodes which wrap around a file system or even the World Wide Web can be used to notify developers when other developers have changed objects.

5.6 General Purpose

Figure 12:
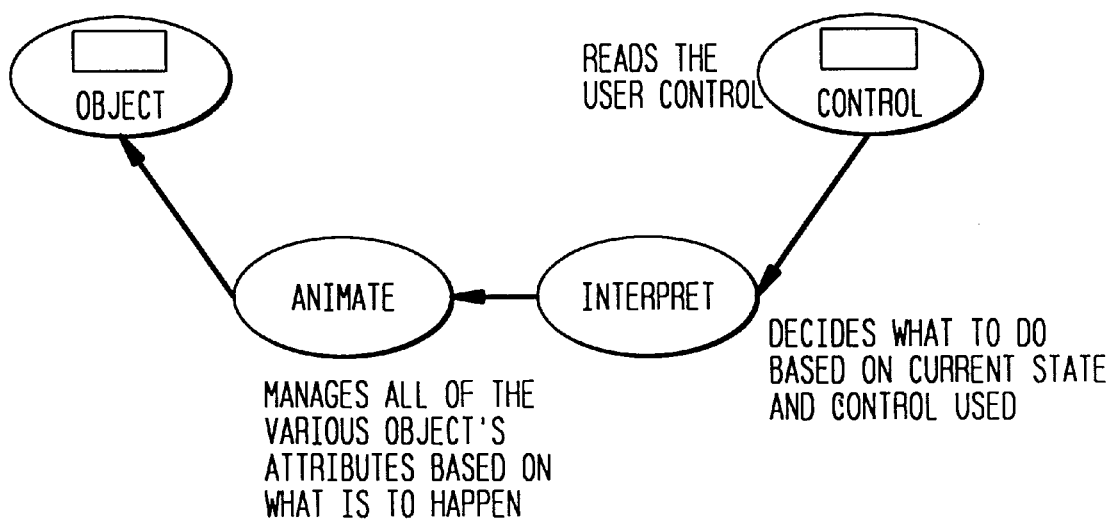
FIG. 12 illustrates the creation of dependencies on events and data outside of the graphics creation process.

Jumping out further to take in an even larger picture, the invention allows the creation of dependencies on events and data outside of the entire creation process. For example in a typical video game the joystick will control the initiation of certain actions (like move left, right, run, walk, jump, etc.). A dependency graph can be set up between the control joystick and the animation parameters that it controls. Even though the content has been created the use of the content can be controlled through a dependency graph; and the control itself determines how to react based on a lower level to dependency graph. This is shown in FIG. 12.

In one embodiment, the present invention is a computer program product (such as a floppy disk, compact disk, etc.

also referred to as a computer usable medium) comprising a computer readable media having control logic recorded thereon. The control logic, when loaded into memory 114 and executed by the CPU 116, enables the CPU 116 to perform the operations described herein. Accordingly, such control logic represents a controller, since it controls the CPU 116 during execution.

While the invention has been particularly shown and described with reference to preferred embodiments thereof, it will be understood by those skilled in the art that various changes in form and details may be made therein without departing from the spirit and scope of the invention.

What is claimed is:

1. A method for controlling and coordinating unrelated operations being performed on a computer system, the method comprising the steps of:

building a dependency graph including interconnected dependency nodes, each dependency node wrapping one of the unrelated operations and including attributes that define the information input/output requirements of the unrelated operation; and traversing said dependency graph to control and coordinate execution of said unrelated operations.

2. A computer program product comprising a computer usable medium having computer readable program code means embodied in said medium for causing an application program to execute on a computer that controls and coordinates unrelated operations being performed on said computer, wherein said computer readable program code means comprising:

a first computer readable program code means for causing the computer to build a dependency graph including interconnected dependency nodes, each dependency node wrapping one of the unrelated operations and including attributes that define the information input/output requirements of the unrelated operation; and a second computer readable program code means for causing the computer to traverse said dependency graph to control and coordinate execution of said unrelated operations.

3. A computer program product comprising a computer usable medium having computer readable program code means embodied in said medium for causing an application program to execute on a computer that operates a graphics processing system that includes a plurality of unrelated operations, said computer readable program code means comprising:

a first computer readable program code means for causing the computer to wrap each of the plurality of unrelated operations with a node, each node providing an interface for communicating information to and from said operation upon which said node is wrapped, each interface defining at least one node attribute, wherein each said node attribute defines a set of predefined data types that each said node attribute can accept, wherein said interface for communicating information allows for asynchronous communication;

a second computer readable program code means for causing the computer to establish, in response to a user request, a connection between a first selected node and a second selected node in accordance with said node attributes of said first and second selected nodes, wherein said second computer readable program means includes, a third computer readable program code means for causing the computer to check a first attribute associated with said first node and a second attribute associated with a second node to determine whether they are compatible for connection; and a fourth computer readable program code means for causing the computer to connect said first and second attributes, when said check indicates that said first and second nodes are compatible for connection;

a fifth computer readable program code means for causing the computer to perform, in response to said user request, an operation of said first selected node; and a sixth computer readable program code means for causing the computer to evaluate information of said second selected node based on said connection with said first selected node and in response to an information request from said operation of said first selected node, wherein said operation of said first selected node is provided with said requested information.

4. The computer program product of claim 3, wherein said sixth computer readable program code means comprises:

a seventh computer readable program code means for causing the computer to perform an operation of said second selected node based on said connection with said first selected node and in response to an information request from said operation of said first selected node, wherein said operation of said first selected node is provided with said requested information.

5. The computer program product of claim 3, wherein said first computer readable program code means comprises:

a seventh computer readable program code means for causing the computer to define input parameters of said node based on input requirements of said operation upon which said node is wrapped;

an eighth computer readable program code means for causing the computer to define output parameters of said node based on output requirements of said operation upon which said node is wrapped; and a ninth computer readable program code means for causing the computer to provide a translation facility to translate between information types, as required, for each input parameter and each output parameter.

6. The computer program product of claim 3, wherein said second computer readable program code means comprises:

a seventh computer readable program code means for causing the computer to check a first attribute associated with said first selected node and a second attribute associated with said second selected node to determine whether they are compatible for connection; and an eighth computer readable program code means for causing the computer to connect said first and said second attributes, when said check indicates that said first and said second selected nodes are compatible for connection.

7. A method for controlling the generation of a scene to a device, comprising the steps of:

(1) encapsulating a plurality of graphics operations into a set of dependency nodes;

(2) specifying a set of attributes for each of said set of dependency nodes, wherein each of said set of attributes describes an input/output for each of said set of dependency nodes;

(3) selecting a subset of said set of dependency nodes;

(4) forming a dependency graph by connecting said subset of dependency nodes, wherein each of said subset of dependency nodes that are connected has like attributes; and (5) traversing, in response to a user request, said dependency graph to evaluate each of said dependency nodes within said subset, wherein said user request specifies information for said set of attributes of each of said dependency nodes within said subset.

8. A computer program product comprising a computer usable medium having computer readable program code means embodied in said medium for causing an application program to execute on a computer that controls the generation of a scene to a device, said computer readable program code means comprising:

a first computer readable program code means for causing the computer to encapsulate a plurality of graphics operations into a set of dependency nodes;

a second computer readable program code means for causing the computer to specify a set of attributes for each of said set of dependency nodes, wherein each of said set of attributes describes an input/output for each of said set of dependency nodes;

a third computer readable program code means for causing the computer to select a subset of said set of dependency nodes;

a fourth computer readable program code means for causing the computer to form a dependency graph by connecting said subset of dependency nodes, wherein each of said subset of dependency nodes that are connected has like attributes; and a fifth computer readable program code means for causing the computer to traverse, in response to a user request, said dependency graph to evaluate each of said subset of dependency nodes, wherein said user request specifies information for said set of attributes of each of said subset of dependency nodes.

* * * * *